(12) United States Patent
Huang et al.

(10) Patent No.: US 11,285,429 B2
(45) Date of Patent: Mar. 29, 2022

(54) SYSTEM FOR TREATING MALODOROUS GAS FROM SLUDGE

(71) Applicant: ANHUI RESOURCE SAVING ENVIRONMENTAL TECHNOLOGY CO., LTD., Anhui (CN)

(72) Inventors: Dudu Huang, Anhui (CN); Yun Wu, Anhui (CN); Sihai Xu, Anhui (CN); Lei Cui, Anhui (CN)

(73) Assignee: ANHUI RESOURCE SAVING ENVIRONMENTAL TECHNOLOGY CO., LTD., Anhui (CN)

( * ) Notice: Subject to any disclaimer, the term of this patent is extended or adjusted under 35 U.S.C. 154(b) by 692 days.

(21) Appl. No.: 16/307,134

(22) PCT Filed: Oct. 31, 2018

(86) PCT No.: PCT/CN2018/112986
§ 371 (c)(1),
(2) Date: Dec. 4, 2018

(87) PCT Pub. No.: WO2020/062401
PCT Pub. Date: Apr. 2, 2020

(65) Prior Publication Data
US 2021/0197115 A1    Jul. 1, 2021

(30) Foreign Application Priority Data
Sep. 28, 2018   (CN) ................. 201811139765.8

(51) Int. Cl.
*B01D 53/053*  (2006.01)
*B01D 53/04*   (2006.01)
(Continued)

(52) U.S. Cl.
CPC ....... *B01D 53/053* (2013.01); *B01D 53/0423* (2013.01); *B01D 53/0446* (2013.01);
(Continued)

(58) Field of Classification Search
CPC ........... B01D 53/0423; B01D 53/0446; B01D 53/047; B01D 53/053; B01D 53/1437;
(Continued)

(56) References Cited

U.S. PATENT DOCUMENTS

| | | | | |
|---|---|---|---|---|
| 2012/0012201 A1* | 1/2012 | Winchester | ............ | B01D 53/04 137/511 |
| 2012/0264197 A1* | 10/2012 | Mitariten | ............... | C12M 47/18 435/266 |
| 2016/0045866 A1* | 2/2016 | Wang | .................... | B01J 20/324 422/180 |

FOREIGN PATENT DOCUMENTS

| | | | | |
|---|---|---|---|---|
| CN | 1748836 A | * | 3/2006 | ............. B01D 53/04 |
| CN | 204619569 U | * | 9/2015 | ............. B01D 46/02 |

(Continued)

OTHER PUBLICATIONS

CN1748836A_ENG (Espacenet machine translation of Jianhua) (Year: 2006).*

(Continued)

*Primary Examiner* — Jonathan Miller
*Assistant Examiner* — Gabriel E Gitman
(74) *Attorney, Agent, or Firm* — JCIPRNET

(57) ABSTRACT

The present application provides a system for treating malodorous gas from sludge, which includes an air compressor, a first pressure swing adsorption tower, a second pressure swing adsorption tower, a buffer tank, a decomposition tank, an exhaust gas scrubber and a vacuum device. The present invention relates to a process for treating malodorous gas from sludge treatment, which includes: compressing the malodorous gas by using an air compressor, and adsorbing by using a pressure swing adsorbent. The air for removing the malodorous component is configured for sludge separation and aerobic aeration in the treatment tank. When the pressure swing adsorbent reaches the design upper limit (Continued)

value, the intake air is stopped, decompression and desorption start, and the enriched malodorous component is sent to catalytic combustion or photocatalytic decomposition, and then the acid gas in the tail gas is neutralized with an alkaline absorbent, and finally discharged to the standard.

9 Claims, 1 Drawing Sheet

(51) Int. Cl.
    *B01D 53/14*      (2006.01)
    *B01D 53/18*      (2006.01)

(52) U.S. Cl.
    CPC ..... *B01D 53/1437* (2013.01); *B01D 53/1456* (2013.01); *B01D 53/1493* (2013.01); *B01D 53/18* (2013.01); *B01D 2252/10* (2013.01); *B01D 2253/102* (2013.01); *B01D 2257/90* (2013.01); *B01D 2259/402* (2013.01)

(58) Field of Classification Search
    CPC ............ B01D 53/1456; B01D 53/1493; B01D 53/18; B01D 53/885; B01D 2252/10; B01D 2253/102; B01D 2257/708; B01D 2257/90; B01D 2259/402; B01D 2259/84; B01D 2258/02; B01D 2258/05; B01D 2258/06; B01D 2255/802; A61L 9/00; A61L 9/16; A61L 9/18; A61L 9/20; A61L 9/22

See application file for complete search history.

(56) References Cited

FOREIGN PATENT DOCUMENTS

| | | | | | |
|---|---|---|---|---|---|
| JP | 2005205094 | A | * | 8/2005 | ............... A61L 9/00 |
| JP | 2007029921 | A | * | 2/2007 | ............. B01D 53/86 |

OTHER PUBLICATIONS

CN204619569U_ENG (Espacenet machine translation of Liu) (Year: 2015).*

JP2005205094A_ENG (Espacenet machine translation of Ishikawa) (Year: 2005).*

JP2007029921A_Eng (Espacenet machine translation of Osada) (Year: 2007).*

* cited by examiner

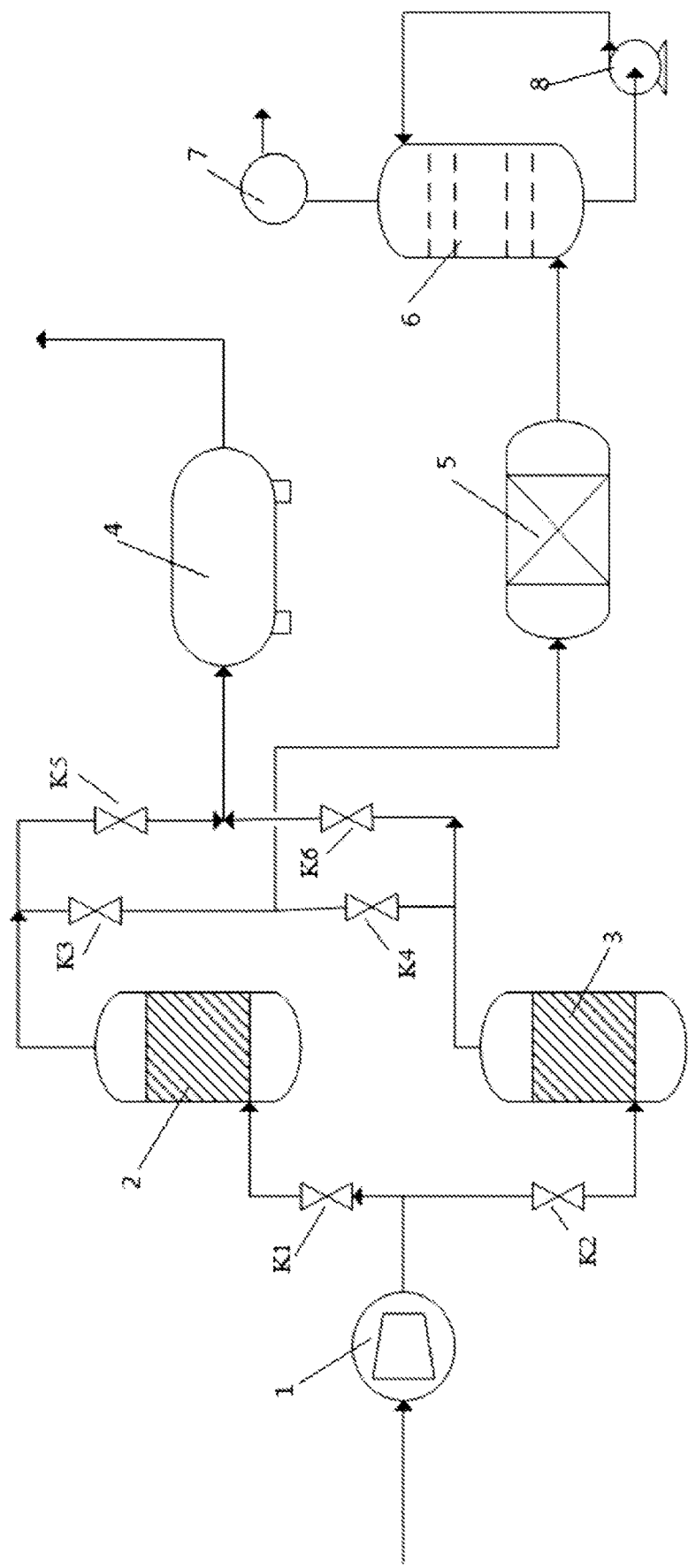

SYSTEM FOR TREATING MALODOROUS GAS FROM SLUDGE

CROSS-REFERENCE TO RELATED APPLICATION

This application is a 371 application of an international PCT application serial no. PCT/CN2018/112986, filed on Oct. 31, 2018, which claims priority to Chinese Patent Application No. 201811139765.8, filed to the Chinese Patent Office on Sep. 28, 2018, entitled "System for treating malodorous gas from sludge", the entire disclosure of which is incorporated herein by reference.

TECHNICAL FIELD OF THE INVENTION

The present invention relates to treatment of gas from sludge, in particular for a system for treating malodorous gas from sludge.

BACKGROUND OF THE INVENTION

At present, large-scale urban sewage treatment plants generally use activated sludge process for sewage treatment. After collecting sludge from each pool, they are subjected to anaerobic degradation, filtration, composting, and finally returned to the field or incinerated. The anaerobic degradation, filtration and composting process of sludge will produce malodorous gas. The source of malodor of the gas is generally hydrogen sulfide, volatile mercaptan, volatile sulfur ether, ammonia, volatile organic amine. Due to unorganized emission and its large ratio, malodorous gas is not easy to diffuse and dilute, and will bring an adverse impact for sanitation in the plant area and surrounding areas. Even when the local concentration is too large, it poses serious safety hazards to the field operators. In order to avoid such incidents, it is necessary to deodorize and detoxify the malodorous gas from sludge treatment.

SUMMARY OF THE INVENTION

Based on the technical problems existing in the background art, the present application provides a system for treating malodorous gas from sludge.

The present application provides a system for treating malodorous gas from sludge, which includes: an air compressor, a first pressure swing absorber, a second pressure swing absorber, a buffer tank, a decomposition tank, an exhaust gas scrubber and a vacuum device;

the inlet of the air compressor is configured for accessing malodorous gas to be treated, the outlet of which is connected to the inlet of the first pressure swing adsorption tower through a first valve, and connected to the inlet of the second pressure swing adsorption tower through a second valve;

the outlet of the first pressure swing adsorption tower is connected to the inlet of the decomposition tank through a third valve, and connected to the inlet of the buffer tank through a fifth valve; the outlet of the second pressure swing adsorption tower is connected to the inlet of the decomposition tank through a fourth valve, and connected to the inlet of the buffer tank through a sixth valve;

the outlet of the buffer tank is configured for outputting the treated gas; the outlet of the decomposition tank is connected to the inlet of the exhaust gas scrubber, the outlet of the exhaust gas scrubber is connected to the inlet of the vacuum device, and the vacuum device is configured for discharging the exhaust gas.

In a preferred embodiment, the exhaust gas scrubber is further configured with a circulation inlet and a circulation outlet, and the circulation inlet and the circulation outlet are connected through a circulation pump.

In a preferred embodiment, in working state, one of the first pressure swing adsorption tower and the second pressure swing adsorption tower is in adsorbed state, and the other one is in desorbed state; the one in adsorption state is configured as an adsorber, the other one in a desorbed state is configured as a desorber;

the air compressor, the adsorber and the buffer tank are connected in sequence to form a first flow passage, and the desorber, the decomposition tank, the exhaust gas scrubber and the vacuum device are connected in sequence to form a second flow passage; among the first valve, the second valve, the third valve, the fourth valve, the fifth valve and the sixth valve, the valves connected in series on the first flow path are all in the turn-on state, and the valve between the desorber and the decomposition tank is also in the turn-on state, and the valve located in the air compressor and the desorber, the valve between the desorber and the buffer tank, and the valve between the adsorber and the decomposition tank are all in the turn-off state.

In a preferred embodiment, the air compressor is configured to compress the malodorous gas to 0.2-2 MPa and input into the adsorption tower.

In a preferred embodiment, the desorber is in a negative pressure state after the vacuum device has been operated.

In a preferred embodiment, the adsorbent material filled in the first pressure swing adsorption tower and the second pressure swing adsorption tower is one or more materials of zeolite molecular sieve, activated carbon, activated alumina, and silica gel.

In a preferred embodiment, the outlet of the buffer tank is in turn connected to a sludge separation tank and an aerobic aeration tank.

In a preferred embodiment, the decomposition tank is deodorized by catalytic combustion or photocatalytic decomposition.

In a preferred embodiment, the washing solvent used in the exhaust gas scrubber is one or more aqueous solutions of sodium hydrogencarbonate, an aqueous solution of sodium carbonate, and an aqueous solution of sodium hydroxide.

The system for treating malodorous gas from sludge proposed in the present application, the first pressure swing adsorption tower and the second pressure swing adsorption tower cooperate to form a treatment system with a symmetric mechanism. In the treatment system, the first pressure swing adsorption tower and the second pressure swing adsorption tower can be switched between the adsorber and the desorber, on the one hand, which can ensure the adsorber adsorbs malodorous gas in real time to avoid break in the processing, and on the other hand, when the adsorber is saturated, it can be switched to the desorber for desorption treatment, thus ensuring the reliability of the adsorber operation.

Compared with the existing polluted gas treatment process, in the present application, the air compressor is configured to take the place of the blower and the compressor, which can reduce energy consumption cost to negligible; Since the adsorbent used in the first pressure swing adsorption tower and the second pressure swing adsorption tower and the catalyst used in the decomposition tank can be recycled after being desorbed, which reduces the replacement frequency significantly, thereby reducing the cost of replacement of raw materials.

In the present application, the volume of the enriched malodorous gas is significantly reduced by the pressure-swing adsorption and decompression regeneration of the pressure swing adsorption tower, thereby improving subsequent processing efficiency and reducing equipment volume. The adsorbent designed by the present application has a large adsorption capacity for various malodorous gases under pressurized conditions. And the process for catalytically decomposing malodorous gas is widely applied, mature and reliable. Finally, the components produced by the decomposition and oxidation of the malodorous gas are absorbed by the alkaline absorption liquid, thereby treating the malodorous gas completely.

In the present application, the adsorbent can be directly sent to incinerators in hazardous waste treatment plants after it reaches the service life. In addition, such high calorific value and low hazard activated carbon is popular to the hazardous waste plant. When the alkaline absorption liquid is neutralized, it can be directly discharged to the wastewater pretreatment unit instead of being discharged. And the cleaned exhaust gas meets the national emission standards, which can be directly emptied.

BRIEF DESCRIPTION OF THE DRAWINGS

FIG. 1 is a schematic view of a system for treating malodorous gas from sludge.

DETAILED DESCRIPTION OF THE PREFERRED EMBODIMENT

Referring to FIG. 1, the present embodiment provides a system for treating malodorous gas from sludge, which includes an air compressor 1, a first pressure swing adsorption tower 2, a second pressure swing adsorption tower 3, a buffer tank 4, a decomposition tank 5, an exhaust gas scrubber 6 and a vacuum device 7.

The inlet of the air compressor 1 is configured to access the malodorous gas to be treated, the outlet of which is connected to the inlet of the first pressure swing adsorption tower 2 through a first valve K1, and connected to the inlet of the second pressure swing adsorption tower 3 through a second valve K2. In this embodiment, the adsorbing materials filled in the first pressure swing adsorption tower 2 and the second pressure swing adsorption tower 3 is one or more materials of zeolite molecular sieve, activated carbon, activated alumina, and silica gel, which is used to adsorb malodorous gases to be treated. The air compressor 1 is configured to compress the malodorous gas to be treated to 0.2-2.0 MPa and then input into the first pressure swing adsorption tower 2 or the second pressure swing adsorption tower 3 to increase the adsorption effect of malodorous gases treated by the first pressure swing adsorption tower 2 and the second pressure swing adsorption tower 3.

The outlet of the first pressure swing adsorption tower 2 communicates with the inlet of the decomposition tank 5 through a third valve K3, and communicates with the inlet of the buffer tank 4 through a fifth valve K5. The outlet of the second pressure swing adsorption tower 3 connected to the inlet of the decomposition tank 5 through a fourth valve K4, and communicates with the inlet of the buffer tank 4 through a sixth valve K6. In the present embodiment, malodorous gas to be treated in the decomposition tank is deodorized by catalytic combustion or photocatalytic decomposition.

The outlet of the buffer tank 4 is configured for outputting the treated gas. Specifically, the outlet of the buffer tank 4 is sequentially connected with a sludge separation tank and an aerobic aeration tank. In this way, the gas by adsorption treatment of the first pressure swing adsorption tower 2 or the second pressure swing adsorption tower 3 is passed into the sludge separation tank and the aerobic aeration tank through the buffer tank 4 to further treat, which can ensure that the exhaust gas discharged meets the national emission standards.

The outlet of the decomposition tank 5 is connected to the inlet of the exhaust gas scrubber 6, the outlet of the exhaust gas scrubber 6 is in communication with the inlet of the vacuum device 7, and the vacuum device 7 is for discharging the exhaust gas.

In the present embodiment, in the operating state of the processing system, one of the first pressure swing adsorption tower 2 and the second pressure swing adsorption tower 3 is in an adsorbed state, and the other is in a desorbed state. The one in the adsorbed state serves as an adsorber, and the other one in the desorbed state serves as a desorber.

The air compressor 1, the adsorption tower, and the buffer tank 4 are sequentially connected to form a first flow path, and the desorber, the decomposition tank 5, the exhaust gas scrubber 6, and the vacuum device 7 are sequentially connected to form a second flow path. Among the first valve K1, the second valve K2, the third valve K3, the fourth valve K4, the fifth valve K5 and the sixth valve K6, the valves connected in series on the first flow path are all in the turn-on state to ensure the smooth flow of the first flow path. And the valve between the desorber and the decomposition tank 5 is also in the turn-on state to ensure the smooth flow of the second flow path. And the valve located between the air compressor 1 and the desorber, the valve between the desorber and the buffer tank 4, and the valve between the adsorber and the decomposition tank 5 are all in the turn-off state to avoid crosstalk between the flow path where the adsorber is located and the flow path where the desorber is located.

In the embodiment, in the working state, the malodorous gas to be treated is compressed by the air compressor 1, enters the adsorption tower for adsorption treatment, and passes through the buffer tank to be processed in a subsequent treatment process for pollution-free discharge. When the adsorption of pollutants in the adsorber increases, the pressure in the adsorber is increased. When the pressure in the adsorber is increased to a certain extent, the adsorber is switched to a desorber, and the valve between the desorber and the air compressor 1 is closed. Because of the negative pressure formed at the outlet end of the desorber under the action of the vacuum device 7, the heavily polluted gas trapped in the desorber can flow into the decomposition tank 5 to be decomposed. And the decomposed gas is washed by the exhaust gas scrubber tower 6 and discharged without pollution. In the present embodiment, after the operation of the vacuum device 7 is completed, the desorber is in a negative pressure state to ensure the effect on gas adsorption when the desorber is again switched to the adsorber.

In the embodiment, the exhaust gas washing tower 6 is further provided with a circulation inlet and a circulation outlet, and the circulation inlet and the circulation outlet are connected by a circulation pump 8. Thus, the exhaust gas can be cycling washing by the circulation pump 8 to ensure that exhaust gas discharged meets the national emission standards. In a preferred embodiment, the washing solvent used in the exhaust gas scrubber is one or more aqueous solutions of sodium hydrogencarbonate, an aqueous solution of sodium carbonate, and an aqueous solution of sodium hydroxide.

As shown in FIG. 1, in the present embodiment, the first pressure swing adsorption tower 2 serves as an adsorber, and the second pressure swing adsorption tower 3 serves as a desorber.

In the first embodiment, the collected malodorous gas is compressed to 1.0 MPa (A) by the air compressor, and the second valve K2, the third valve K3 and the sixth valve K6 are closed, and the first valve K1 and the fourth valve K4 and the fifth valve K5 are opened. The malodorous gas to be treated compressed by the air compressor 1 enters the first pressure swing adsorption tower filled with granular activated carbon to be deodorized. And the deodorized gas after being fully adsorbed enters the buffer tank. According to actual production needs, the deodorized gas is discharged to the sludge separation tank and the aerobic aeration tank.

Specifically, in the present embodiment, when the second pressure swing adsorption tower is switched from the adsorption tower to the desorber, the internal pressure of the second pressure swing adsorption tower reaches 1 atm (A), desorption starts.

The vacuum device 7 is turned on, which adjusts the internal pressure of the second pressure swing adsorption tower 3 to 0.06 MPa (A). After sufficient desorption for 2 hours, the vacuum device 7 is turned off, to keep the second pressure swing adsorption tower 3 ready for use, which is convenient for switching between desorber and adsorber. In the present embodiment, the enriched malodorous gas is decomposed and oxidized under 254 nm ultraviolet rays by the TiO2 catalyst in the decomposition tank 5 during the desorption process, the acid gas generated from which is treated with a 10% sodium hydroxide aqueous solution in the exhaust gas scrubber 6. Finally, the clean gas is evacuated through the vacuum device 7.

In the second embodiment, the collected malodorous gas is compressed to 1.2 MPa (A) by the air compressor 1, and the first valve K1, the fourth valve K4 and the fifth valve K5 are closed, and the second valve K2 and the third valve K3 and the sixth valve K6 are opened. The gas compressed by the air compressor 1 enters the second pressure swing adsorption tower 3 filled with granular activated carbon, and the deodorized gas after being fully adsorbed enters the buffer tank 4. Then the deodorized gas is discharged into the sludge separation tank and the aerobic aeration tank according to actual production needs.

At the same time, the first pressure swing adsorption tower 2 is in a desorption state. Desorption starts when the internal pressure of the first pressure swing adsorption tower 2 reaches 1 atm (A). The vacuum device is turned on to start to maintain the pressure in the first pressure swing adsorption tower 2 at 0.05 MPa (A). After 3 hours of sufficient desorption, the vacuum device 7 is turned off, and the first pressure swing adsorption tower 2 is kept ready for use. During the desorption process, the enriched malodorous gas is decomposed and oxidized under 365 nm ultraviolet rays by TiO2 catalyst in a decomposition tank 5. The generated acid gas is removed by a 15% sodium hydroxide aqueous solution in an exhaust gas scrubber 6, and then the clean gas is evacuated through a vacuum device 7.

The above is only the preferred embodiment of the present application, but the scope of protection of the present application is not limited thereto, and any equivalents or modifications of the technical solutions of the present application and the application concept thereof should be included in the scope of the present application within the scope of the technical scope of the present application.

The invention claimed is:

1. A system for treating malodorous gas from sludge comprising: an air compressor, a first pressure swing adsorption tower, a second pressure swing adsorption tower, a buffer tank, a decomposition tank, an exhaust gas scrubber and a vacuum device;
   wherein the air compressor comprises an inlet that is configured for accessing the malodorous gas to be treated, and an outlet; the first pressure swing adsorption tower comprises an inlet connected to the outlet of the air compressor through a first valve; the second pressure swing adsorption tower comprises an inlet connected to the outlet of the air compressor through a second valve;
   the first pressure swing adsorption tower comprises an outlet, the decomposition tank comprises an inlet connected to the outlet of the first pressure swing adsorption tower through a third valve; the buffer tank comprises an inlet connected to the outlet of the first pressure swing adsorption tower of through a fifth valve;
   the second pressure swing adsorption tower comprises an outlet, the inlet of the decomposition tank is connected to the outlet of the second pressure swing adsorption tower through a fourth valve; the inlet of the buffer tank is connected to the outlet of the second pressure swing adsorption tower through a sixth valve;
   the buffer tank comprises an outlet that is configured for outputting a treated gas; the decomposition tank comprises an outlet; the exhaust gas scrubber comprises an inlet connected to the outlet of the decomposition tank; the exhaust gas scrubber comprises an outlet; the vacuum device comprises an inlet connected to the outlet of the exhaust gas scrubber; and the vacuum device is configured for discharging an exhaust gas.

2. The system for treating malodorous gas from sludge according to claim 1, wherein the exhaust gas scrubber is further provided with a circulation inlet and a circulation outlet, and the circulation inlet and the circulation outlet are connected by a circulation pump.

3. The system for treating malodorous gas from sludge according to claim 1, wherein in a working state, one of the first pressure swing adsorption tower and the second pressure swing adsorption tower is in an adsorbed state, and the other is in a desorbed state; the one in the adsorption state is configured as an adsorber, the other one in a desorbed state is configured as a desorber;
   the air compressor, the adsorber and the buffer tank are connected in sequence to form a first flow passage, and the desorber, the decomposition tank, the exhaust gas scrubber and the vacuum device are in sequence connected to form a second flow passage; among the first valve, the second valve, the third valve, the fourth valve, the fifth valve and the sixth valve, the valves which are connected in sequence on the first flow path are all in the turn-on state, and the valve between the desorber and the decomposition tank is also in the turn-on state, and the valve located between the air compressor and the desorber, the valve between the desorber and the buffer tank, and the valve between the adsorber and the decomposition tank are all in the turn-off state.

4. The system for treating malodorous gas from sludge according to claim 3, wherein the air compressor is configured to compress the malodorous gas to 0.2-2 MPa and then input into the adsorption tower.

5. The system for treating malodorous gas from sludge according to claim 3, wherein the desorber is in a negative pressure state after the vacuum device has been operated.

6. The system for treating malodorous gas from sludge according to claim 1, wherein an adsorbent material filled in the first pressure swing adsorption tower and the second pressure swing adsorption tower is one or more materials of zeolite molecular sieve, activated carbon, activated alumina, and silica gel.

7. The system for treating malodorous gas from sludge according to claim 1, wherein the outlet of the buffer tank is in turn connected to a sludge separation tank and an aerobic aeration tank.

8. The system for treating malodorous gas from sludge according to claim 1, wherein the decomposition tank is deodorized by catalytic combustion or photocatalytic decomposition.

9. The system for treating malodorous gas from sludge according to claim 1, wherein a washing solvent used in the exhaust gas scrubber is one or more aqueous solutions of sodium hydrogencarbonate, an aqueous solution of sodium carbonate, and an aqueous solution of sodium hydroxide.

* * * * *